(12) United States Patent
Lemonnier et al.

(10) Patent No.: US 10,850,415 B2
(45) Date of Patent: Dec. 1, 2020

(54) PELLETIZING KNIFE WITH REMOVABLE BLADE

(71) Applicant: AMN DPI, Notre Dame-de-Gravenchon (FR)

(72) Inventors: Philippe Lemonnier, Notre Dame-de-Gravenchon (FR); Anthony Brument, Notre Dame-de-Gravenchon (FR); Christian Pierens, Notre Dame-de-Gravenchon (FR)

(73) Assignee: AMN DPI, Notre Dame-de-Gravenchon (FR)

( * ) Notice: Subject to any disclaimer, the term of this patent is extended or adjusted under 35 U.S.C. 154(b) by 0 days.

(21) Appl. No.: 15/526,476

(22) PCT Filed: Nov. 14, 2014

(86) PCT No.: PCT/IB2014/002909
§ 371 (c)(1),
(2) Date: May 12, 2017

(87) PCT Pub. No.: WO2016/075505
PCT Pub. Date: May 19, 2016

(65) Prior Publication Data
US 2017/0305026 A1    Oct. 26, 2017

(51) Int. Cl.
*B26D 1/29*    (2006.01)
*B29B 9/06*    (2006.01)
(Continued)

(52) U.S. Cl.
CPC ............... *B26D 1/29* (2013.01); *B26D 1/00* (2013.01); *B26D 1/0006* (2013.01);
(Continued)

(58) Field of Classification Search
CPC .......... B26D 1/29; B26D 1/00; B26D 1/0006; B26D 7/2614; B26D 2001/002; B26D 2001/0033; B26D 2001/006; B29B 9/065
See application file for complete search history.

(56) References Cited

U.S. PATENT DOCUMENTS 3,990,337 A * 11/1976 Barbour, Jr. ......... B26D 1/0006
83/425
4,667,713 A    5/1987 Wright
(Continued)

FOREIGN PATENT DOCUMENTS

WO    2013/178220 A1    12/2013

OTHER PUBLICATIONS

International Search Report of PCT/162014/002909 dated Jul. 13, 2015 [PCT/ISA/210].
(Continued)

*Primary Examiner* — Omar Flores Sanchez
(74) *Attorney, Agent, or Firm* — Sughrue Mion, PLLC

(57) ABSTRACT

A blade (6) for underwater granulation of an extruded polymer, this blade has a plate (60) bounded by a contour including a cutting edge contour (61) having a first end (62) and a second end (63), and an outer contour (64) linking the first end (62) and the second end (63) of the cutting edge contour (61). The outer contour (64) has at least a first bearing portion (65) and a second bearing portion (66), the first bearing portion (65) and the second bearing portion (66) diverging while extending away from the cutting edge contour (61) and configured to be received in a dovetail housing (13).

15 Claims, 7 Drawing Sheets

(51) Int. Cl.
  *B26D 7/26* (2006.01)
  *B26D 1/00* (2006.01)
  *B29C 48/00* (2019.01)
  B29C 48/345 (2019.01)
  B29C 48/04 (2019.01)

(52) U.S. Cl.
  CPC ............ *B26D 7/2614* (2013.01); *B29B 9/065* (2013.01); *B29C 48/00* (2019.02); *B26D 2001/002* (2013.01); *B26D 2001/006* (2013.01); *B26D 2001/0033* (2013.01); *B29C 48/0022* (2019.02); *B29C 48/04* (2019.02); *B29C 48/345* (2019.02)

(56) References Cited

U.S. PATENT DOCUMENTS

| | | | | |
|---|---|---|---|---|
| 5,435,714 | A * | 7/1995 | Van Lengerich | A21C 3/04 425/311 |
| 7,258,044 | B2 * | 8/2007 | Williams | B26D 1/29 425/113 |
| 2013/0042738 | A1 | 2/2013 | Iwasaki et al. | |

OTHER PUBLICATIONS

Written Opinion of PCT/IB2014/002909 dated Jul. 13, 2015 [PCT/ISA/237].

* cited by examiner

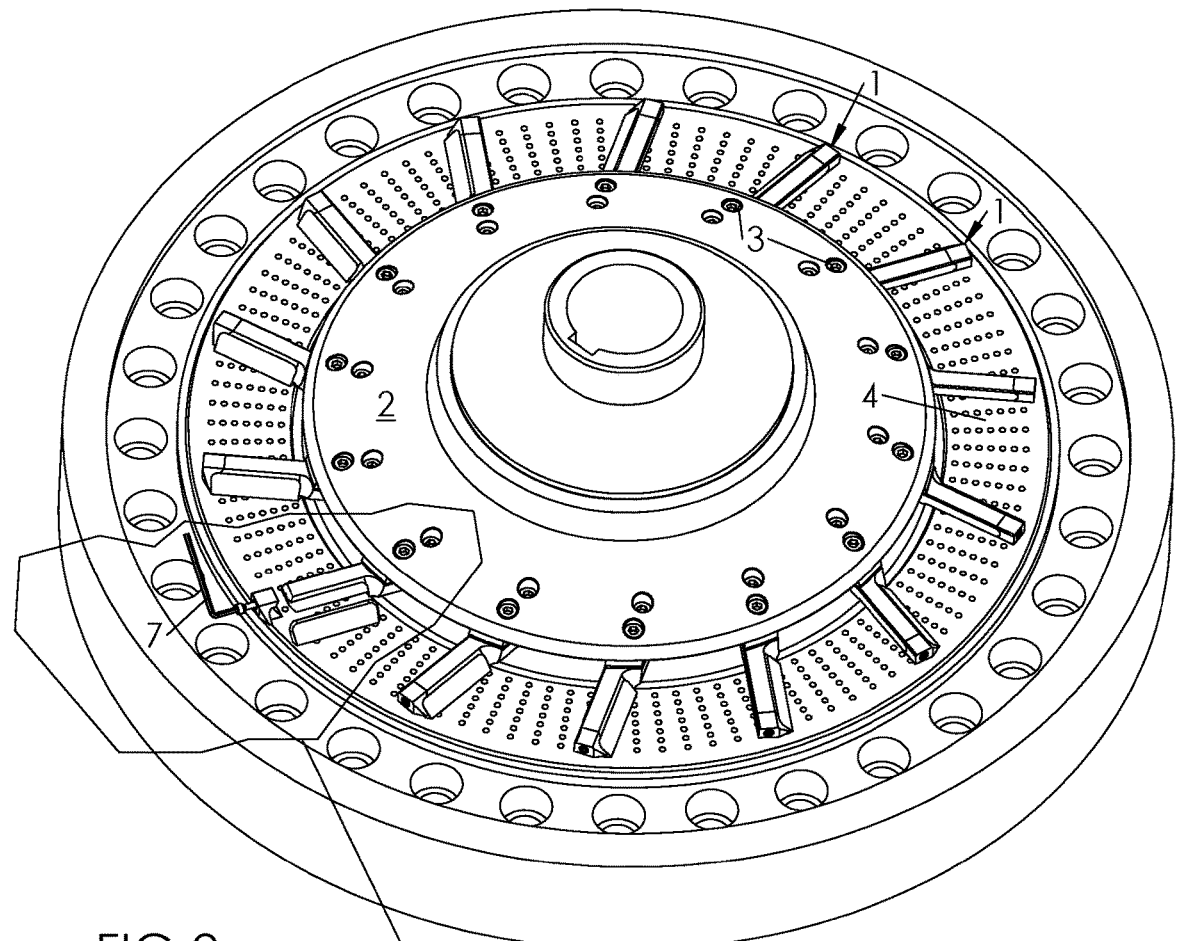
FIG.2
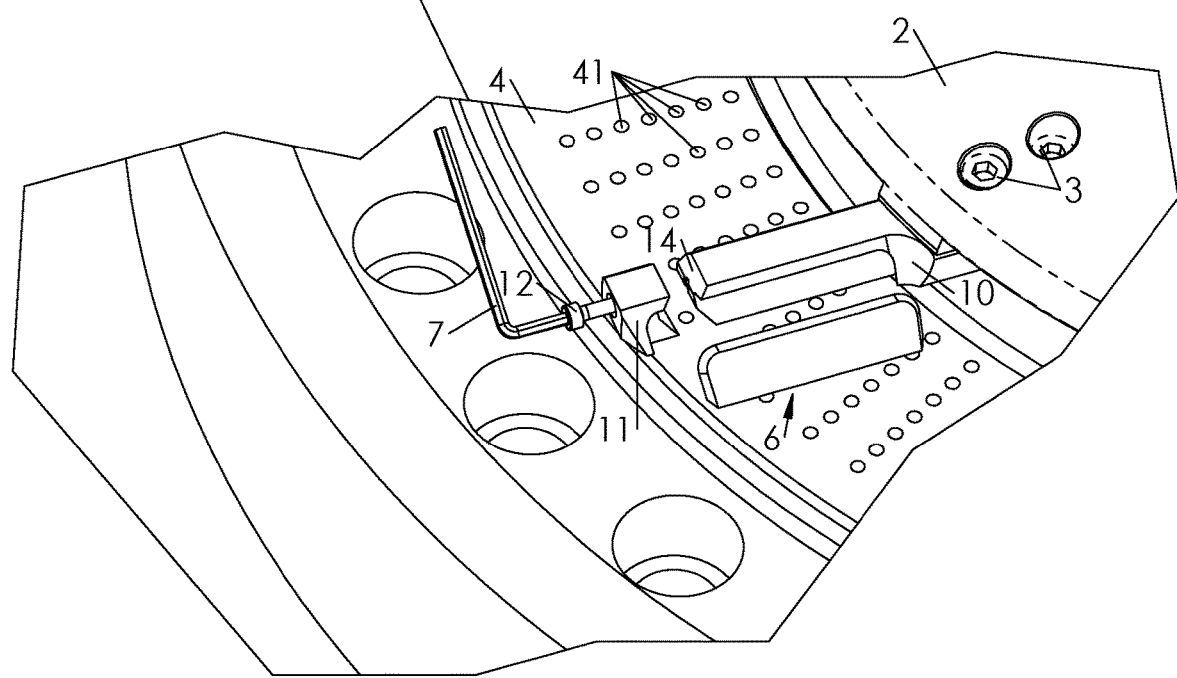

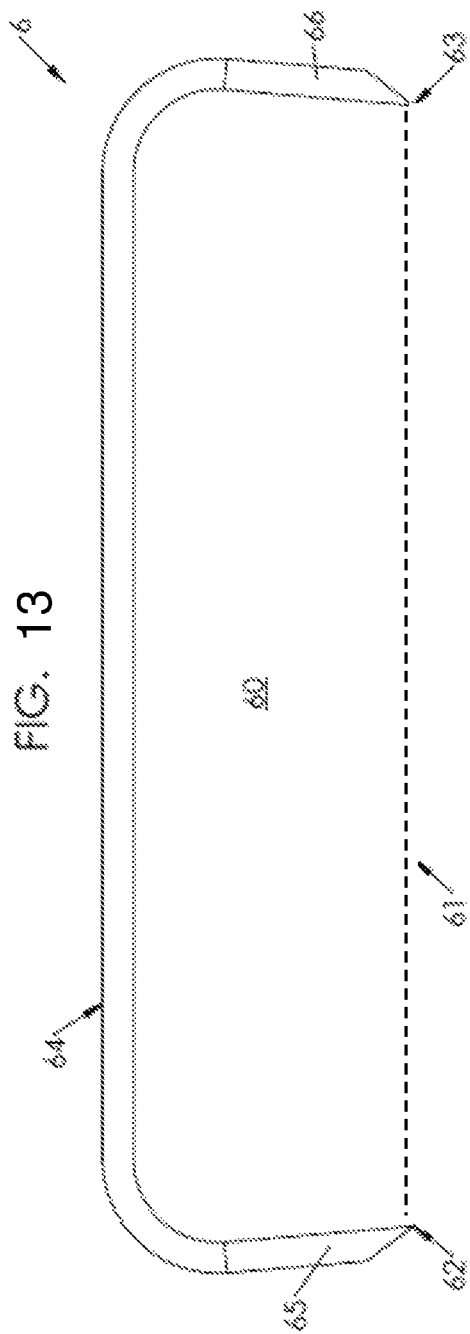

PELLETIZING KNIFE WITH REMOVABLE BLADE

CROSS REFERENCE TO RELATED APPLICATIONS

This application is a National Stage of International Application No. PCT/IB2014/002909, filed Nov. 14, 2014, the contents of which are incorporated herein by reference in its entirety.

FIELD OF THE INVENTION

The present invention relates generally to underwater granulation systems and more particularly to underwater pelletizing knives.

BACKGROUND OF THE INVENTION

In the field of underwater granulation of extruded polymers, it is well known that polymers, or more generally thermoplastic materials, may be granulated by extrusion through multiple orifices in a die plate so that the molten polymer emerges in continuous strand form (a spaghetti-like form) into a water filled chamber and, while immersed in the water, is immediately cut into granules by a rotating cutter assembly including a plurality of knives. These knives have cutting edges describing a cutting plane positioned directly adjacent and parallel to the planar face of the die plate. The obtained pellets or granules are, then, entrained in water flow.

In particular, in this granulation process, knives are subject to many constraints that determine the production quality of the whole process. Namely, in order to achieve a precise cutting action and a uniform size and shape of pellets, these knives must have a sharp cutting edge of hard materials resistant to corrosion, to cavitation, to wear, and to high temperature.

In this regard, conventional knives are generally composed of
- a main body formed out of steel (or stainless steel) adapted to be mounted on the cutting rotor and acting as a blade holder; and
- a blade, comprising the cutting edge of the knife, formed out of titanium carbide (TiC) or tungsten carbide which is brazed, welded or otherwise suitably bonded to the blade holder so that forming one piece therewith.

It results in that blades, generally, constitute an integral part of currently proposed underwater pelletizing knives.

However, as it has to sequentially and accurately cut polymer strands of different melt index at high processing speed, under water flow and high temperature and, as well as its possible coming in contact with the die plate, the blade impairment is much greater than that of the blade holder. Nevertheless, as the blade and the blade holder form a sole block, manufacturers are constrained to regularly replace the whole knife, even if the blade holder is still functional.

Moreover, underwater pelletizing knives are not easily accessible. Therefore, in addition to the cost of the knife itself, the system downtime so as to permit the replacement of a knife is very expensive as this operation is usually time consuming. In fact, when a knife needs replacement, the operator should suspend the granulating process, opens the granulating chamber so that the worn knife is accessible, unscrews/removes the worn knife from the rotating cutter assembly, sets/screws the new knife, and adjusts this knife in respect to the die plate surface before resuming the granulation process. Accordingly, current underwater pelletizer cutting means cannot be easily serviced.

SUMMARY OF THE INVENTION

Various embodiments are directed to addressing the effects of one or more of the problems set forth above. The following presents a simplified summary of embodiments in order to provide a basic understanding of some aspects of the various embodiments. This summary is not an exhaustive overview of these various embodiments. It is not intended to identify key of critical elements or to delineate the scope of these various embodiments. Its sole purpose is to present some concepts in a simplified form as a prelude to the more detailed description that is discussed later.

An object of various embodiments is to overcome above drawbacks.

Various embodiments relate to a blade for underwater granulation of an extruded polymer, this blade comprising a plate bounded by a contour including
- a cutting edge contour having a first end and a second end, and
- an outer contour linking the first end and the second end of the cutting edge contour, this outer contour comprising at least a first bearing portion and a second bearing portion, the first bearing portion and the second bearing portion diverging while extending away from the cutting edge contour and being configured to be received in a dovetail housing.

In accordance with a broad aspect, the plate is a trapezoidal-like shaped plate, the shorter base side of this trapezoidal-like shape including the cutting edge contour. This plate may be a truncated oblique trapezoidal pyramid.

In accordance with another broad aspect, the cutting edge contour is wave-curved, or curved with a predefined radius of curvature.

In accordance with a broad aspect, the blade is formed out of titanium carbide, or of tungsten carbide.

Further, various embodiments relate to a blade holder holding the above blade, the blade holder comprising a first longitudinal locking element and a second locking element, the second locking element being configured to be removably mounted on the first longitudinal locking element in the longitudinal extension of this first longitudinal locking element, this blade holder, further, comprising a housing extending longitudinally on a lateral face of the first longitudinal locking element and the second locking element mounted on the first longitudinal locking element so that the inner contour of the housing includes at least a first portion in the first longitudinal locking element and a second portion in the second locking element thereby forming a dovetail housing.

In accordance with a broad aspect, the second locking element is configured to be removably mounted on the first longitudinal locking element in the longitudinal extension of this first longitudinal locking element through a mortise-and-tenon joint so that preventing the rotation of one relative to another and guide the assembly of the first longitudinal locking element and the second locking element.

In accordance with another broad aspect, the blade holder further comprises fastening means for removably mounting the second locking element on the first longitudinal locking element.

Further, various embodiments relate to a knife for underwater granulation of an extruded polymer, this knife comprising the above blade and the above blade holder.

Further, various embodiments relate to a rotating knifes holder of an underwater pelletizer for underwater granulation of an extruded polymer, this rotating knifes holder being configured to receive the above knife.

While the various embodiments are susceptible to various modification and alternative forms, specific embodiments thereof have been shown by way of example in the drawings. It should be understood, however, that the description herein of specific embodiments is not intended to limit the various embodiments to the particular forms disclosed.

It may of course be appreciated that in the development of any such actual embodiments, implementation-specific decisions should be made to achieve the developer's specific goal, such as compliance with system-related and business-related constraints. It will be appreciated that such a development effort might be time consuming but may nevertheless be a routine understanding for those or ordinary skill in the art having the benefit of this disclosure.

DESCRIPTION OF THE DRAWING

The objects, advantages and other features of various embodiments will become more apparent from the following disclosure and claims. The following non-restrictive description of preferred embodiments is given for the purpose of exemplification only with reference to the accompanying drawings in which

FIG. 2 illustrates an assembly of FIG. 1 components and a large-scale view of an exploded view of a knife mounted on this assembly with a Allen key;

FIG. 13 illustrates a blade having a blade edge shown in dashed lines to represent a variety of edge geometries.

It is to be noted that like reference characters refer to like parts throughout the description of the drawings.

DETAILED DESCRIPTION OF ILLUSTRATIVE EMBODIMENTS

Figure 1:
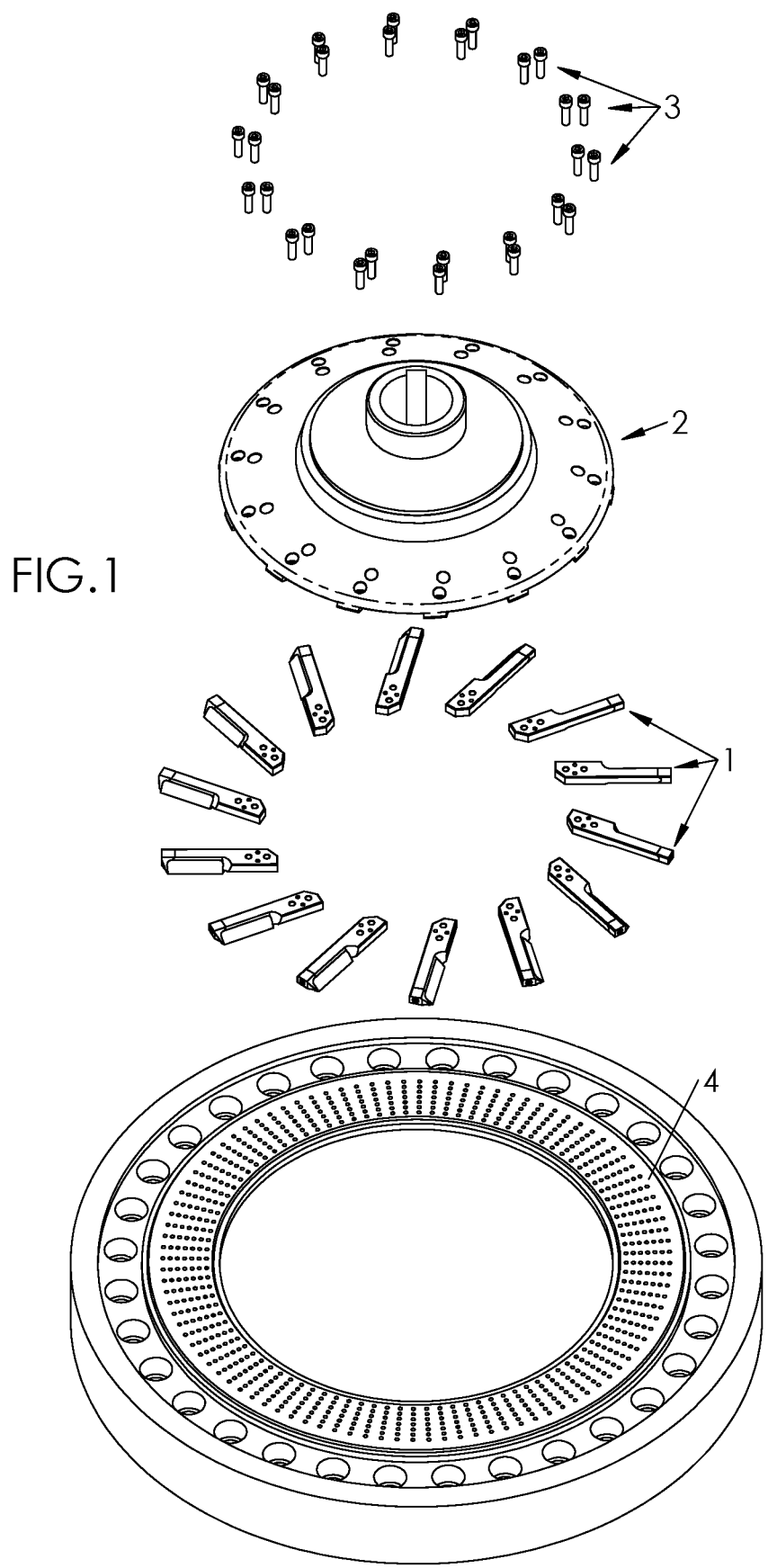
FIG. 1 illustrates a perspective exploded view of a die plate and the components of a rotating cutter assembly.

With reference to FIG. 1, a plurality of knives 1 are adapted to be mounted on a rotating knifes holder 2. In one embodiment, these knifes 1 are screwed to the knife holder 2 by means of a plurality of screws 3. In an alternative embodiment, the knives 1 are united with the rotating knifes holder 2 (i.e. being part of a cutter hub or welded thereto) instead of to be fastened thereto through screws 3, bolts or any equivalent means.

Figure 3:
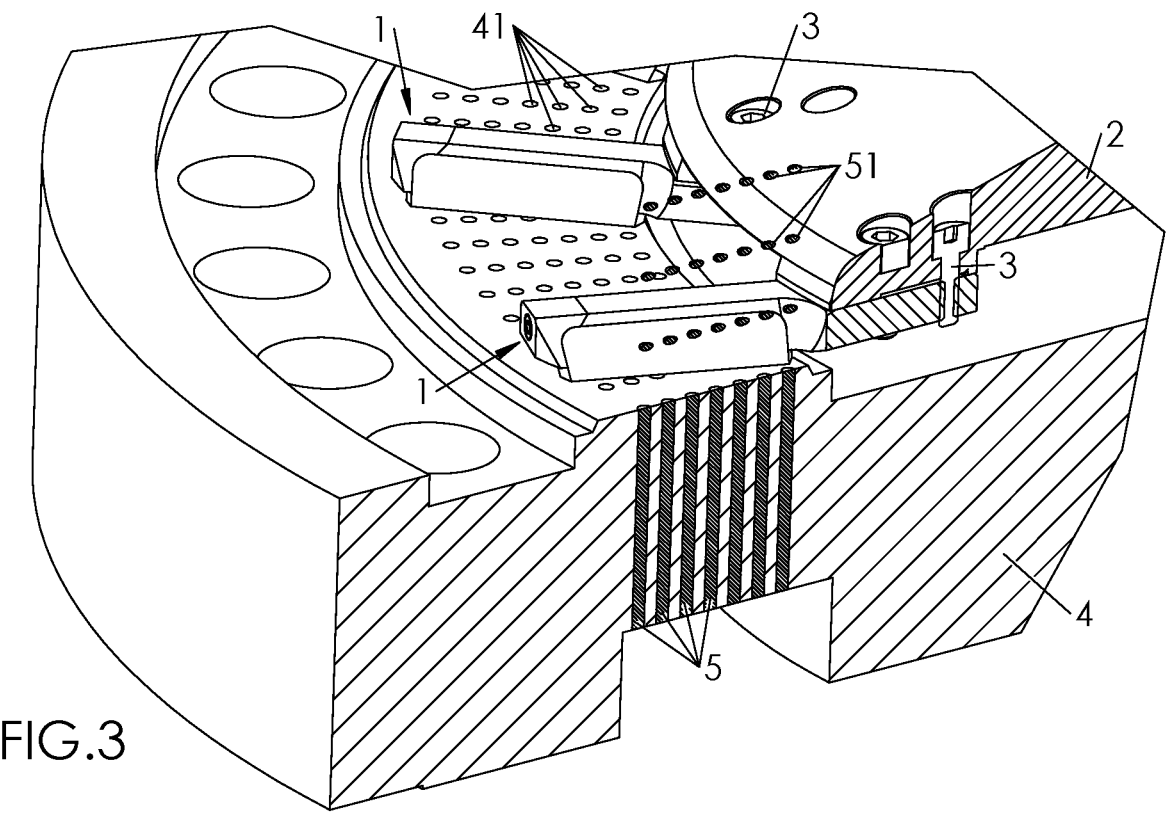
FIG. 3 illustrates a cross-sectional view of the components of FIG. 1 assembled while an extruded polymer granulation.
Figure 4:
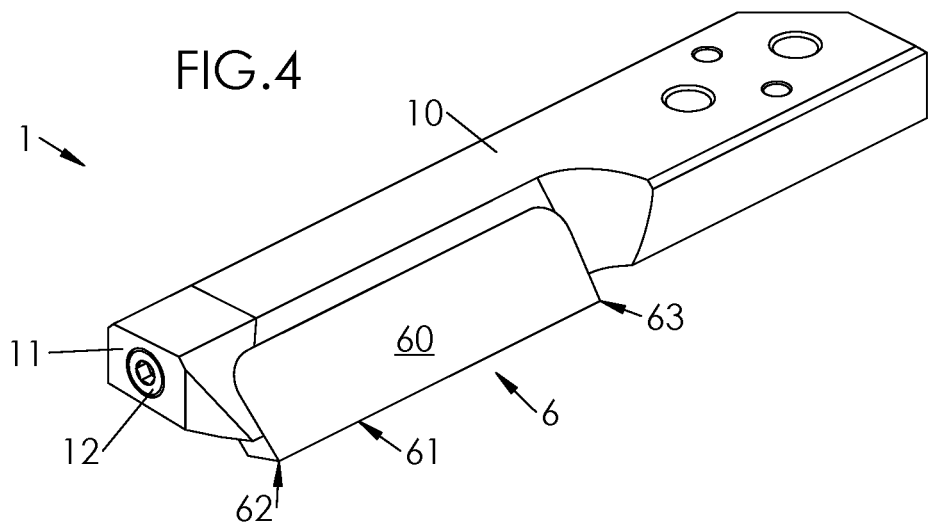
FIG. 4, FIG. 5, FIG. 6, FIG. 7 and FIG. 8 illustrate, respectively, a perspective view, a top plan view, a front view, a cross-sectional view along axis labeled VII-VII in FIG. 6, and a longitudinal cross-section view along axis labeled VIII-VIII in FIG. 6 of a knife for underwater granulation of an extruded polymer according to one embodiment.
Figure 5:
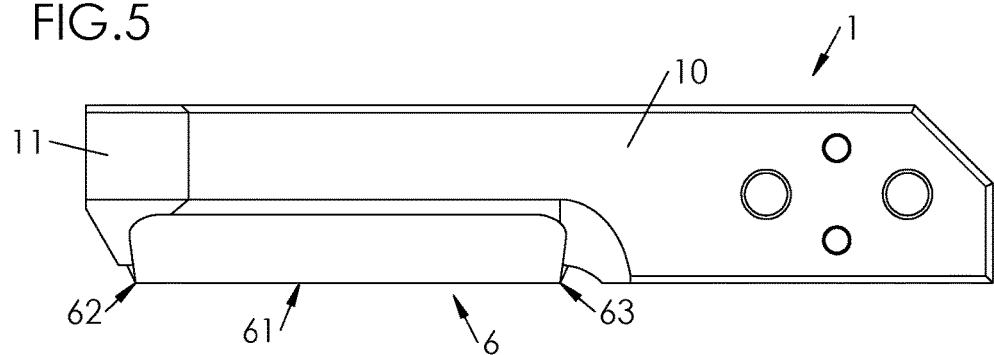
Figure 6:
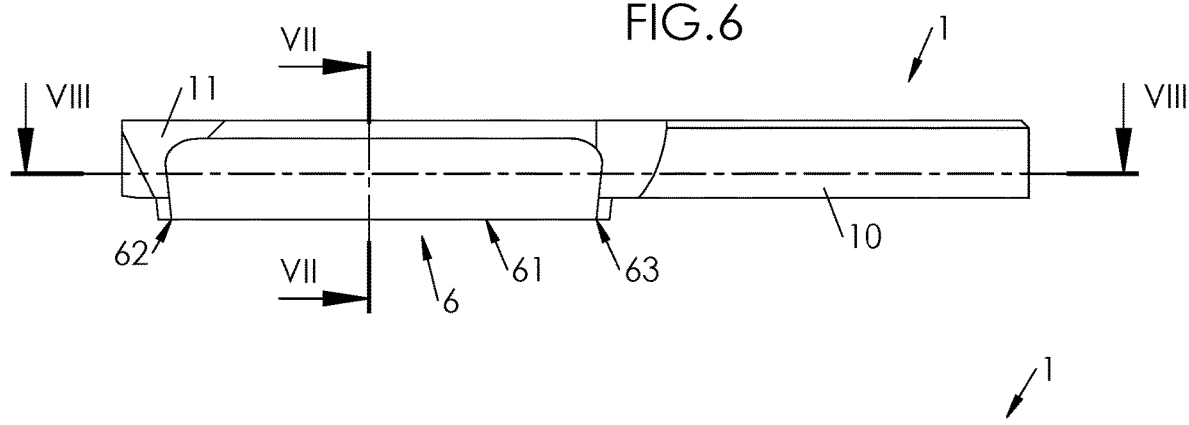

As shown in FIG. 2, when the various knives 1 are mounted and driven in rotation by means of the rotating knifes holder 2, their cutting edges describe a cutting plane adjacent and parallel to the planar face of the die plate 4. As depicted in FIG. 3, the extruded polymers 5 in strand form through the multiples orifices 41 in the die plate 4 are immediately cut into granules 51 by the cutting edges of the knifes 1.

With reference now to FIGS. 4 to 9, the knife 1 for underwater pelletizers comprises a blade holder and a blade 6.

The blade holder includes a main body 10, and a sub-body 11. Preferably, the main body 10 and the sub-body 11 are formed out of stainless steel.

The sub-body 11 is configured to be detachably/removably mounted on the main body 10 in the longitudinal extension of the main body 10. In one embodiment, the sub-body 11 is removably mounted on the main body 10 by means of a screw 12. More generally, the sub-body 11 may be removably attached to the main-body 10 by means of screws, bolts or any equivalent attaching means.

Figure 9:
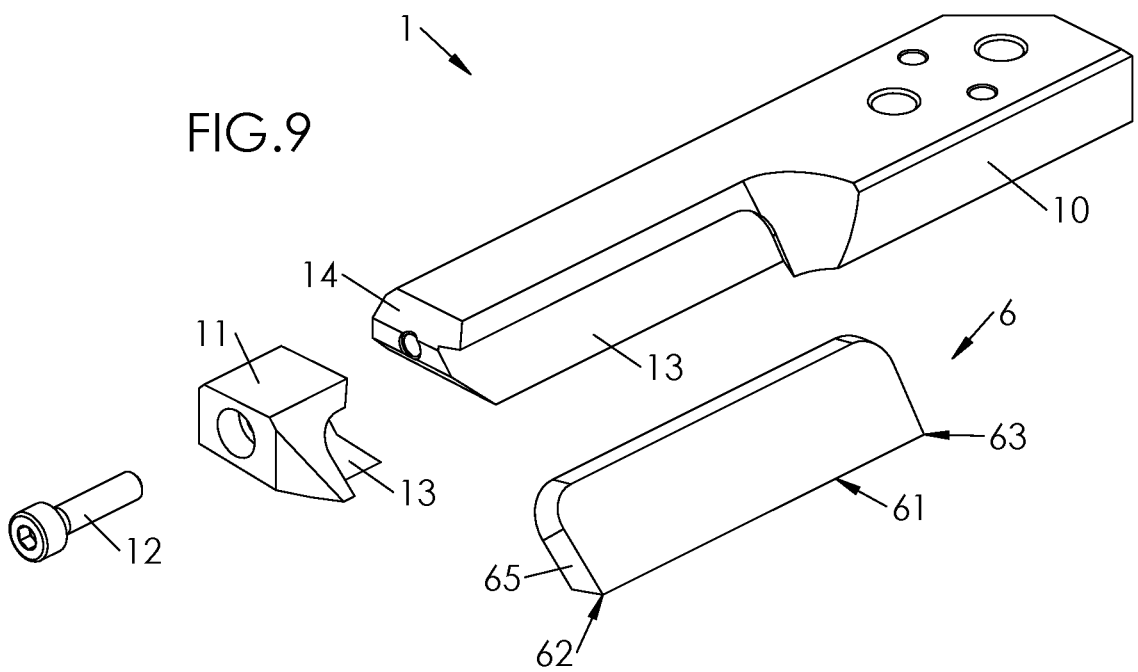
FIG. 9 illustrate a perspective exploded view of a knife including a blade holder and a blade according to one embodiment.

In order to prevent the rotation of one relative to another and guide the assembly of the main body 10 and the sub-body 11, a (non-circular) mortise-and-tenon joint 14 is used for this connection (see FIG. 9).

Figure 10:
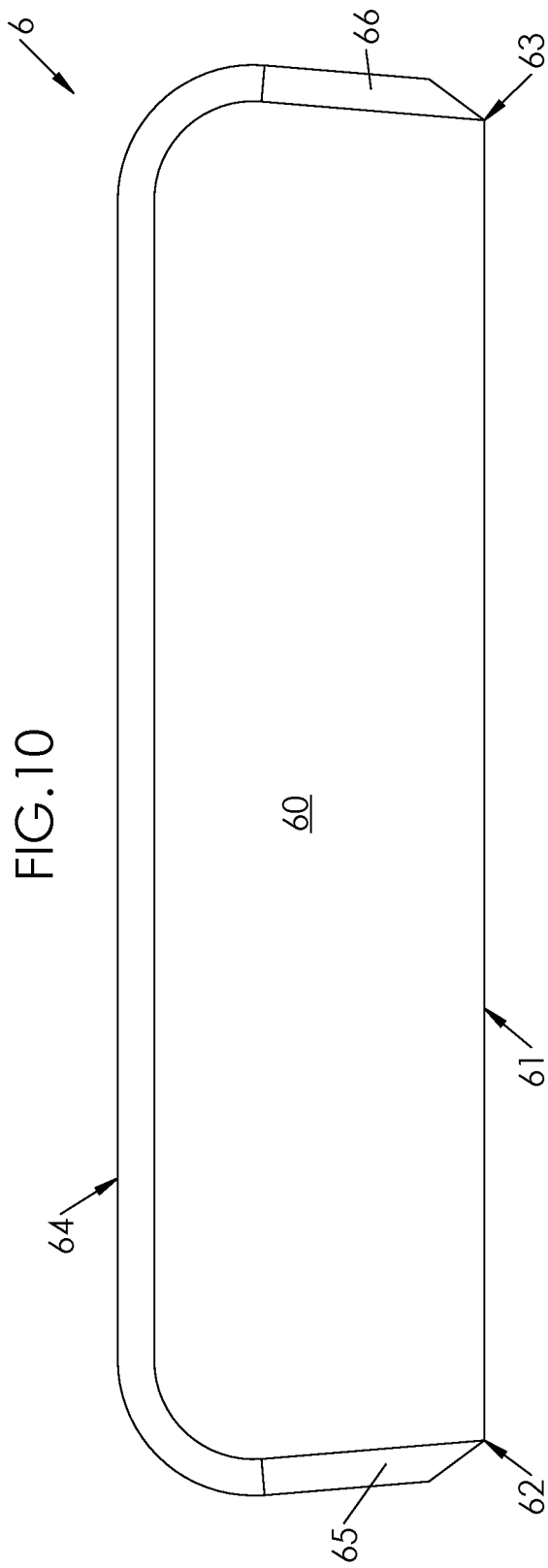
FIG. 10, FIG. 11, and FIG. 12 illustrate, respectively, a perspective view, a front view, and a left view of a blade for underwater granulation of an extruded polymer according to one embodiment.
Figure 11:
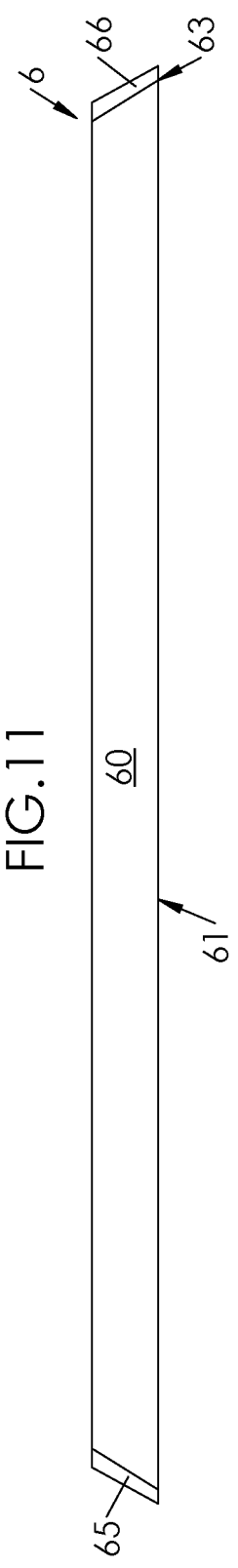
Figure 12:

With reference now to FIGS. 10-12, the blade 6 has a plate-like form. The blade 6 is, preferably, formed out of titanium carbide (TiC) or of tungsten carbide. In one embodiment, the blade 6 is a trapezoidal-like shaped plate (a trapezoid with rounded or not corner(s)) as it may be clearly seen on FIG. 10.

This plate may have the shape of a truncated oblique trapezoidal pyramid (see FIGS. 10 and 12). The longer base side of this trapezoidal shape is configured to be received in a housing 13 extending longitudinally on a lateral face of the main body 10 and the sub-body 11 assembled. The shorter base side of the trapezoidal shape comprises the cutting edge 61. The blade 6 of the FIGS. 10 to 12 has a transversal symmetry plane.

The housing 13 made in the blade holder is a continuous longitudinal groove on the lateral surface of the main body 10 and the sub-body 11 assembled so that the inner contour of the housing 13 includes at least a first portion in the main body 10 and a second portion in the sub-body 11 thereby forming a dovetail housing 13 (see FIG. 9). Therefore, the dovetail-shaped groove (or housing) 13 constitutes a trapezoidal housing adapted to house/receive and fit with the longer base side of the trapezoidal form of the blade 6 so that forming a dovetail joint. In other words, the blade holder, including the main body 10 and the sub-body 11, holds the blade 6 through a dovetail joint which comprises a trapezoidal dovetail housing 13, or more generally any dovetail-shaped groove 13. In this dovetail joint, the dovetail mortise is the housing 13 and the dovetail tenon is a part of the outer contour of the blade 6.

Figure 7:
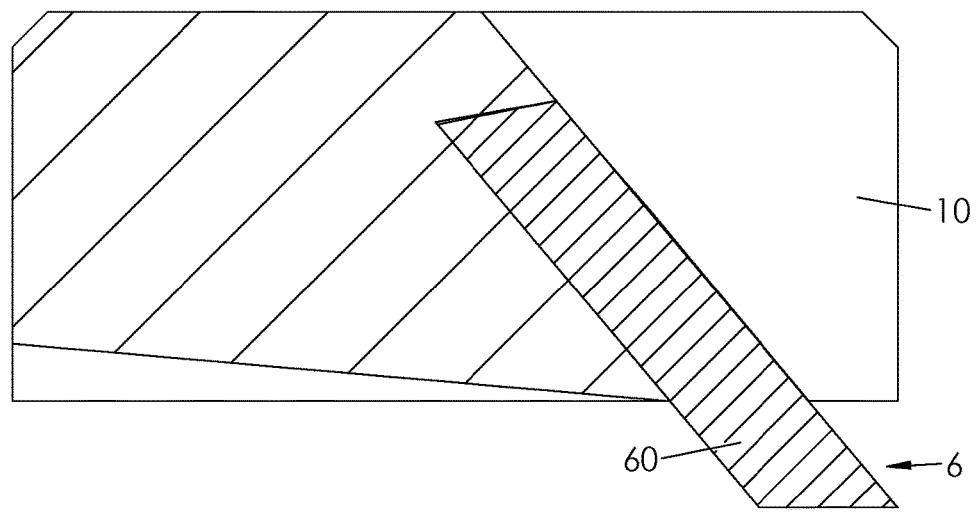
Figure 8:
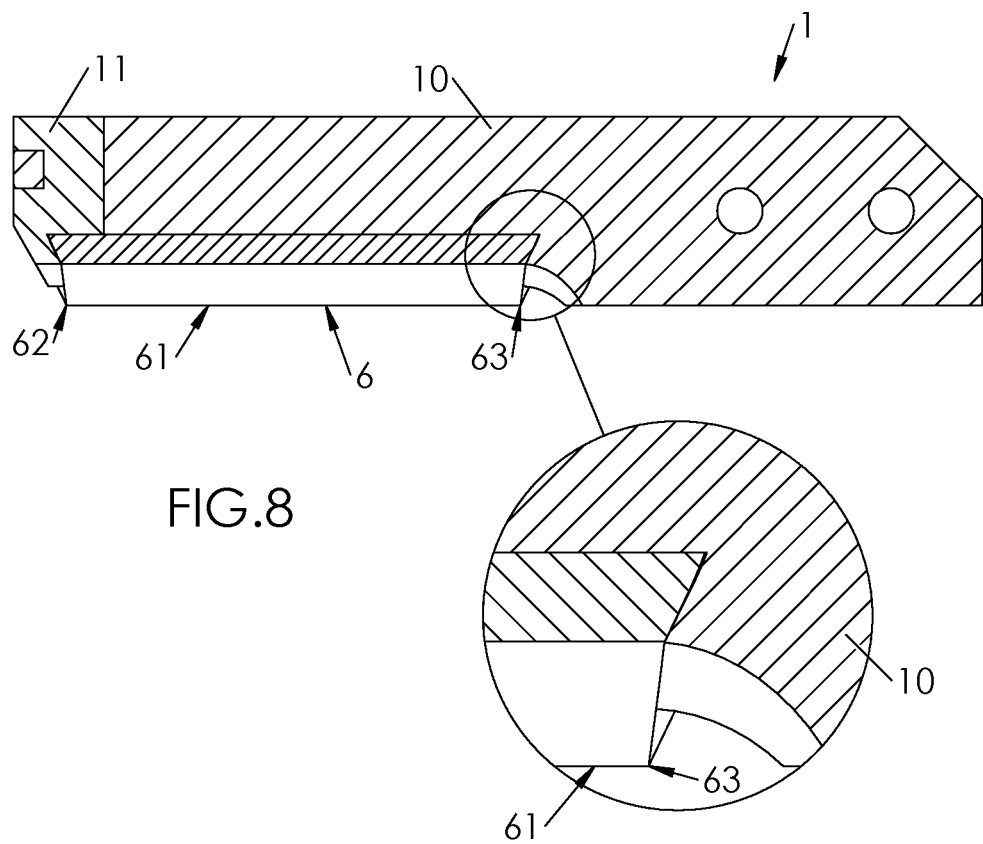

The dovetail housing 13 extends in the longitudinal direction with appropriate depth in the man body 10 and sub-body 11 so that, when the blade 6 is engaged therein, the cutting edge of the blade 6 diagonally protrudes beyond the main body 10 and the sub-body 11 (see FIG. 7).

The dovetail housing 13 extends on both the main body 10 and the sub-body 11 assembled so that the main body 10 and sub-body 11 together, respectively, constitute a first longitudinal locking element 10 and a second locking element 11 for retaining/interlocking the blade 6.

Accordingly, by unscrewing/screwing the sub-body 11 (or more generally the second locking element 11) from/on the main body 10 (or more generally the first longitudinal locking element 10), the blade 6 may be removably retained in the dovetail-shaped groove 13.

More generally, the blade 6 may have any other appropriate form fitting with a corresponding dovetail-shaped groove 13 in the blade holder. In fact, with reference to FIGS. 10 and 11, the blade 6 may be any plate 60 bounded by a contour comprising a cutting edge contour 61 having a first end 62 and a second end 63, and an outer contour 64 linking the first end 62 and the second end 63 of the cutting edge contour 61, this outer contour 64 including at least a first bearing portion 65 and a second bearing portion 66, these bearing portions 65 and 65 diverging while extending away from the cutting edge contour 61.

In one embodiment, the cutting edge contour 61 may be straight line-shaped, wave-shaped, curved with a predefined radius of curvature, or of any appropriate shape for efficiently cutting extruded materials.

The corresponding blade holder includes a dovetail-shaped groove (i.e. a dovetail mortise) which is adapted to fittingly receive/house the first bearing portion 65 and the second bearing portion 66 (i.e. the dovetail tenon) so that the blade 6 can be locked, through the resulting dovetail joint, to its correspondent blade holder.

Due to the resulting dovetail joint, the blade may be held by the blade holder without any screwing means that operate directly on the blade.

With reference to FIG. 2, for replacing the blade 6, an Allen 7 key is received in a corresponding aperture in the top of the screw 12 and rotated so that the second locking element 11 (i.e. the sub-body 12) is unscrewed from the first longitudinal locking element 10 (i.e. the main body 10) and consequently the blade can be moved and disengaged from the dovetail housing 13. An identifier associating the second locking element 11 to the first longitudinal locking element 10 may be printed on both locking elements 10 and 11 so that avoiding mixing up the second locking elements 11 of the different knifes 1 mounted on rotating knifes holder 2.

The above-described embodiments have the following advantages:

by surrounding a large part of the plate-shaped blade 6, the dovetail-shaped housing 13 provides increased support and protection for the blade 6 (in comparison to a blade brazed or welded to the main body along a small area);

the blade 6 is easily removable and, therefore, easily replaceable. In fact as shown in FIG. 2, if the sharpness of blade 6 is altered, it may be easily replaced without need to remove the main body 10 from the rotating knifes holder 2 (removing, fixing and adjustment of the main body 10 of the blade holder are time-consuming). Moreover, the screw 12 is readily accessible (from the side of the rotating knifes holder 2) so that adjustments or replacements of a blade 6 may be accomplished quickly and easily;

in terms of production costs, the useful lifetime of the blade holder (namely, the main body 10 and the sub-body 11) is prolonged, and there is no need for brazing or welding process;

the blades are replaceable, thereby reducing over-all operating and maintenance costs of underwater pelletizers.

In particular, the fact that the sub-body 11 is mounted in the longitudinal extension of the main-body 10 permits a radial access to the rotating knifes holder 2.

In fact, for replacing a blade 6, the screw 13 is readily accessible from the side of the rotating cutter assembly without need to completely open the granulating chamber. Accordingly, the replacement of a blade 6 may be accomplished quickly and easily (namely, with the least downtime of the granulation process).

Advantageously, it results from the above described embodiments a specific structural arrangement of the knife 1 so that the blade 6 can be radially (in relation to the die plate 4 and the rotating knifes holder 2) accessed and removably fixed to the blade holder. Indeed, when it is worn, the movably attached blade 6 may be quickly and easily replaced.

Advantageously, the above described structural arrangement of the knife 1 components comprises a dovetail joint for removably holding/attaching a blade 6 for underwater granulation of an extruded polymer.

The invention claimed is:

1. A blade for underwater granulation of an extruded polymer, the blade comprising a plate that extends in a longitudinal direction, bounded longitudinally by a contour including:

a cutting edge contour having a first end and a second end, the cutting edge contour extending in the longitudinal direction, and an outer contour linking the first end and the second end of the cutting edge contour, wherein the contour, including the cutting edge contour and the outer contour, is of a trapezoidal shape and the outer contour comprises at least a first bearing portion and a second bearing portion, the first bearing portion and the second bearing portion diverging while extending away from the cutting edge contour and being configured to be received in a dovetail housing.

2. The blade of claim 1, the trapezoidal shape includes the cutting edge contour.

3. The blade of claim 2, wherein the plate is a truncated oblique trapezoidal pyramid.

4. The blade of claim 1, wherein the cutting edge contour is wave-curved.

5. The blade of claim 1, wherein the cutting edge contour is curved with a predefined radius of curvature.

6. The blade of claim 1, wherein the plate is formed out of titanium carbide.

7. The blade of claim 1, wherein the plate is formed out of tungsten carbide.

8. A blade holder for holding the blade of claim 1, the blade holder comprising a first longitudinal locking element and a second locking element, the second locking element being configured to be removably mounted on the first longitudinal locking element in the longitudinal extension of this first longitudinal locking element, this blade holder further, comprises a housing extending longitudinally on a lateral face of the first longitudinal locking element and the second locking element mounted on the first longitudinal locking element so that the inner contour of the housing includes at least a first portion in the first longitudinal locking element and a second portion in the second locking element thereby forming a dovetail housing.

9. The blade holder according to claim 8, wherein the second locking element is configured to be removably mounted on the first longitudinal locking element in the longitudinal extension of this first longitudinal locking element through a mortise-and-tenon joint so that preventing the rotation of one relative to another and guide the assembly of the first longitudinal locking element and the second locking element.

10. The blade holder according to claim 8, wherein this blade holder further comprises fastening means for removably mounting the second locking element on the first longitudinal locking element.

11. A knife for underwater granulation of an extruded polymer, this knife comprising the blade of claim 1 and a blade holder comprising a first longitudinal locking element and a second locking element, the second locking element being configured to be removably mounted on the first longitudinal locking element in the longitudinal extension of this first longitudinal locking element, the blade holder further comprises a housing extending longitudinally on a lateral face of the first longitudinal locking element and the second locking element mounted on the first longitudinal locking element so that the inner contour of the housing includes at least a first portion in the first longitudinal locking element and a second portion in the second locking element thereby forming a dovetail housing.

12. A rotating knifes holder of an underwater pelletizer for underwater granulation of an extruded polymer, this rotating knifes holder being configured to receive the knife of claim 11.

13. The blade holder according to claim 8, wherein the blade holder further comprises a screw that removably mounts the second locking element on the first longitudinal locking element.

14. A blade for underwater granulation of an extruded polymer comprising a plate comprising:

- a length extending in a longitudinal direction of the plate that is longer than a width extending in a transverse direction with respect to the longitudinal direction of the plate;
- a first side defining a top surface and an opposite second side defining a bottom surface;
- a first bevel extending in the longitudinal direction and extending from the second surface to the first surface at an oblique angle with respect to the second surface, the first bevel defining a cutting edge in the longitudinal direction, the cutting edge having a first end and a second end; and
- a second bevel extending in the longitudinal direction and in the transvers direction so as to define a contour around three sides of the plate and link the first end and the second end of the cutting edge, the second bevel extending from the first surface to the second surface at an oblique angle with respect to the first surface;
- wherein the contour defines a first bearing portion and a second bearing portion, the first bearing portion and the second bearing portion diverging while extending along the transverse direction and configured to be received in a dovetail housing.

15. The blade for underwater granulation of an extruded polymer according to claim 14, wherein the cutting edge extends substantially the entire length of the plate.

* * * * *